(12) United States Patent
Pollock et al.

(10) Patent No.: US 6,788,020 B1
(45) Date of Patent: *Sep. 7, 2004

(54) ELECTRICAL MACHINES

(75) Inventors: Charles Pollock, Rutland (GB); Helen Geraldine Phyllis Pollock, Rutland (GB)

(73) Assignees: Black & Decker, Inc., Newark, NJ (US); University of Warwick, Warwichshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/048,501

(22) PCT Filed: Aug. 17, 2000

(86) PCT No.: PCT/GB00/03197

§ 371 (c)(1),
(2), (4) Date: Jun. 25, 2002

(87) PCT Pub. No.: WO01/13511

PCT Pub. Date: Feb. 22, 2001

(30) Foreign Application Priority Data

Aug. 17, 1999  (GB) .............................................. 9919345
Oct. 14, 1999  (GB) .............................................. 9924203

(51) Int. Cl.[7] .............................................. G05B 11/28
(52) U.S. Cl. ...................................... 318/599; 318/254
(58) Field of Search ................................ 318/599, 254, 318/701, 138, 139, 432, 434, 439, 727

(56) References Cited

U.S. PATENT DOCUMENTS 4,935,708 A    6/1990  Weldon et al. ................ 322/62

(List continued on next page.)

FOREIGN PATENT DOCUMENTS

DE    196 54 040 A1    7/1997

(List continued on next page.)

OTHER PUBLICATIONS

British Search Report, Application No. GB 9924203.4, dated Jun. 14, 2000.

(List continued on next page.)

*Primary Examiner*—Rina Duda
*Assistant Examiner*—Renata McCloud
(74) *Attorney, Agent, or Firm*—Renner, Otto, Boisselle & Sklar, LLP

(57) ABSTRACT

An electrical machine comprises a rotor without windings, a stator having an armature winding (24,25) and a field winding (10) for generating a magnetomotive force in a direction extending transversely of the magnetomotive force generated by the armature winding. An electric circuit (40) is provided for controlling the current in the armature winding (24, 25) such that periods in which a magnetomotive force in one direction is associated with a first current pulse alternate with periods in which a magnetomotive force in the opposite direction is associated with a second current pulse. A position sensor is provided for monitoring the rotational position of the rotor and for supplying output signals dependent on the speed of rotation of the moor. Furthermore a control system (32) supplies control signals to the circuit (40) to control the current in the armature winding (24, 25), each control signal being produced in response to detection of a respective one of the output signals from the position sensor and being maintained for a length of time determined by the duration of the output signal. Such an arrangement enables control of acceleration, no-load speed and loaded torque-speed characteristics (and braking of the machine) to be achieved with simple on/off control of armature and field switching devices (if present), so that the control circuitry can be produced at relatively low cost. Simplification of the control circuitry is further ensured by the fact that such control can be effected without current sensing.

17 Claims, 9 Drawing Sheets

U.S. PATENT DOCUMENTS

| | | | | |
|---|---|---|---|---|
| 5,001,405 A | * | 3/1991 | Cassat | 318/254 |
| 5,334,917 A | * | 8/1994 | Lind | 318/254 |
| 5,359,272 A | | 10/1994 | Liao | 318/732 |
| 5,650,887 A | * | 7/1997 | Dovek et al. | 360/75 |
| 5,739,662 A | | 4/1998 | Li | 318/701 |
| 5,754,024 A | | 5/1998 | Sugiyama | 318/701 |
| 5,844,385 A | * | 12/1998 | Jones et al. | 318/254 |
| 6,014,001 A | * | 1/2000 | Guinet | 318/701 |

FOREIGN PATENT DOCUMENTS

| | | |
|---|---|---|
| GB | 2 194 693 A | 3/1988 |
| GB | 2 244 571 A | 12/1991 |
| SU | 406697 A1 | 6/1988 |
| WO | 98/01942 | 1/1998 |
| WO | 98/05112 | 2/1998 |

OTHER PUBLICATIONS

British Search Report, Application No. GB 9919345.0, dated Dec. 20, 1999.

British Search Report, Application No. GB 9924203.4, dated Mar. 6, 2000.

British Search Report, Application No. GB 9924203.4, dated Jun. 20, 2000.

British Search Report, Application No. GB 9924203.4, dated Jun. 15, 2000.

British Search Report, Application No. GB 9924203.4, dated Jun. 15, 2000.

Barnes et al.; "Selecting Power Electronic Converters for Single Phase Switched Reluctance Motors"' IEE Conference Publication No. 456, UK, London: IEE, Sep. 21, 1998 (pp. 527–531, XP000800133 ISBN: 0–85296–704–7.

Elliott et al.; "High Performance Control of Phase Current in the Switched Reluctance Motor"; European Conference on Power Electronics and Applications; B, Brussels, EPE Association; vol. CONF. 6, Sep. 19, 1995; pp. 3223–3228; XP000538316.

Wale et al.; "Novel Converter Topologies for a Two–Phase Switched Reluctance Motor with Fully Pitched Windings"; PESC Record: Annual IEEE Power Electronics Specialists Conference. Formerly Power Conditioning Specialists Conference 1970–1971 and Power Processing and Electronic Specialists Conference 1972, US, New York, IEE, vol. Conf. 27, Jun. 1, 1996, pp. 1798–1803, XP002045099, ISBN: 0–7803–3501–5.

* cited by examiner

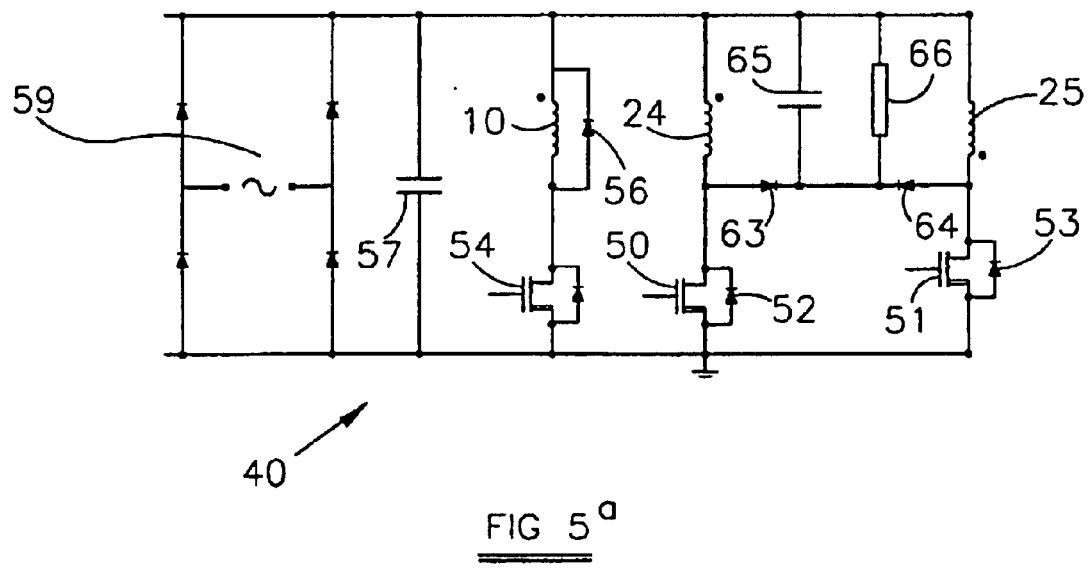
FIG 5ª
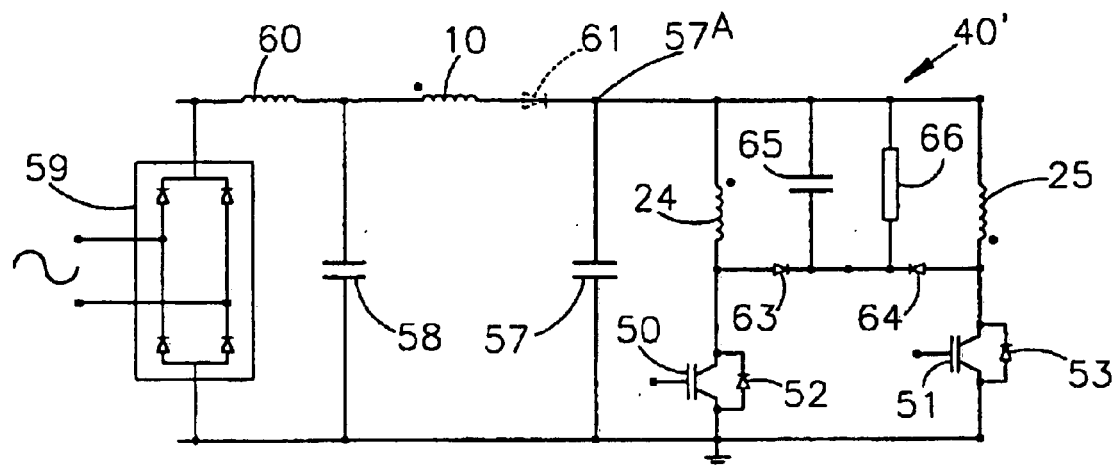
FIG 5ᶜ

ELECTRICAL MACHINES

Reference is also made to the Applicants' co-pending Applications Nos. PCT/GB00/03213, PCT/GB00/03201 and PCT/GB00/03214 the disclosures of which are incorporated herein by reference.

This invention relates to electrical machines, and is concerned more particularly, but not exclusively, with electric motors.

FIGS. 1a and 1b shows a conventional two-phase variable reluctance motor comprising a stator 2 having two pairs 3, 4 of oppositely disposed inwardly directed salient poles provided with two pairs 5, 6 of energising windings corresponding to the two phases, and a rotor 7 having a single pair 8 of oppositely disposed outwardly directed salient poles without windings. Each of the four energising windings is wound about its corresponding pole, as indicated by the symbols Y—Y denoting two diametrically opposite portions of each winding of the winding pair 6 and the symbols X—X denoting two diametrically opposite portions of each winding of the winding pair 5. An excitation circuit (not shown) is provided for rotating the rotor 7 within the stator 2 by alternately energising the stator windings in synchronism with rotation of the rotor so that torque is developed by the tendency of the rotor 7 to arrange itself in a position of minimum reluctance within the magnetic field produced by the windings, as will be described in more detail below. Such a variable reluctance motor offers tho advantage over a conventional wound rotor motor that a commutator and brushes which are wearing parts, are not required for supply of current to the rotor. Furthermore other advantages are provided because there are no conductors on the rotor and high-cost permanent magnets am not required.

The symbols +and − in FIGS. 1a and 1b show the directions of current flow in the windings in the two alternate modes of excitation in which the rotor 7 is attracted either to the horizontal position or to the vertical position as viewed in the figures. It will be appreciated that rotation of the rotor 7 requires alternate energisation of the winding pairs 5 and 6, preferably with only one winding pair 5 or 6 being energised at a time, and with the current usually being supplied to each winding pair 5 or 6 in only one direction during such energisation. However the windings can only be energised for a maximum of half the time per revolution if useful torque is to be produced, so that highly efficient utilisation of the electrical circuit is not possible with such a motor.

By contrast a fully pitched variable reluctance motor, as described by J. D. Wale and C. Pollock, "Novel Converter Topologies for a Two-Phase Switched Reluctance Motor with Fully Pitched Windings", IEEE Power Electronics Specialists Conference, Braveno, June 1996, pp. 1798–1803 and as shown in FIGS. 2a and 2b (in which the same reference numerals are used to denote like parts as in FIGS. 1a and 1b) comprises two windings 10 and 11 having a pitch which is twice the pole pitch of the motor, that is 180° in the example illustrated, and disposed at 90° to one another. The winding 11 may be wound so that one part of the winding on one side of the rotor 7 fills a stator slot 12 defined between adjacent poles of the pole pairs 3, 4, and another part of the winding 11 on the diametrically opposite side of the rotor 7 fills a stator slot 13 defined between two further adjacent poles of the pole pairs 3, 4. The winding 10 has corresponding parts filling diametrically opposed stator slots 14 and 15. Thus the two windings 10 and 11 span the width of the motor with the axes of the windings 10, 11 being at right angles to one another.

Furthermore two alternate modes of excitation of such a motor corresponding to the horizontal and vertical positions of the rotor 7 are shown in FIGS. 2a and 2b from which it will be appreciated that both windings 10, 11 are energised in both modes of excitation, but that, whereas the direction of current flow in the winding 10 is the same in both modes, the direction of current flow in the winding 11 changes between the two modes. Since current is supplied to both phase windings 10, 11 in both modes and since each winding 10 or 11 occupies half the total stator slot area, such a system can achieve 100% utilisation of its slot area. This contrasts with the 50% utilisation achieved with the conventional wound variable reluctance motor described above in which only one phase winding is energised at a time. Furthermore, since there is no requirement for the direction of current in the winding 10 to change, the winding 10, which may be termed the field winding, can be supplied with direct current without any switching which leads to simplification of the excitation circuit used. However the winding 11, which may be termed the armature winding, must be energised with current which alternates in synchronism with the rotor position so as to determine the changing orientation of the stator flux required to attract the rotor alternately to the horizontal and vertical positions. The need to supply the armature winding with alternating current in such a motor can result in an excitation circuit of high complexity and cost.

J. R. Surano and C-M Ong, "Variable Reluctance Motor Structures for Low-Speed Operation", IEEE Transactions on Industry Applications, Vol. 32, No. 2, March/April 1996, pp 808–815 and UK Patent No. 2262843 also disclose fully pitched variable reluctance motors. The motor disclosed in UK Patent No. 2262843 is a three-phase variable reluctance motor having three windings which must be energised with current in synchronism with rotation of the rotor so that such a motor requires an excitation circuit of high complexity.

WO 98/05112 discloses a fully pitched flux-switching motor having a four-pole stator 2 which, as shown diagrammatically in FIG. 3a, is provided with a field winding 10 and an armature winding 11 each of which is split into two coils 22 and 23 or 24 and 25 closely coupled (with a coupling which is substantially independent of rotor position) and wound so that diametrically opposite portions of both coils are disposed within diametrically opposite stator slots. FIG. 3b shows a generalised circuit diagram for energising the armature coils 24 and 25. The coils 24 and 25 are connected within the circuit so that direct current supply to the terminals 26 and 27 flows through both coils 24 and 25 in the same direction so as to generate magnetomotive forces in opposite direction as a result of the opposite winding of the coils. Switches 28 and 29, which may comprise field effect transistors or thyristors for example, are connected in series with the coils 24 and 25 and are switched alternately to effect alternate energisation of the coils 24 and 25 so as to provide the required magnetomotive forces acting in opposite directions. It is an advantage of such an arrangement that the armature winding is made up of two closely coupled coils which enables each coil to be energised with current in only one direction so that relatively simple excitation circuitry can be used. A similar arrangement may be provided in an electrical alternator.

GB 18027 dated Sep. 9, 1901 discloses a variable reluctance machine having sets of windings on the stator which are alternately energised so as to provide the required interaction with the rotor. Furthermore GB 554827 discloses an inductor alternator in which the relative arrangement of the stator and rotor teeth produces successive zones of relatively high and low reluctance, and in which field and alternative current windings are provided on the stator to effect the required energisation. However, neither of these prior arrangements possesses the advantageous feature of the closely coupled coils arrangement of WO 98/05112 so that complex associated circuitry is again required.

The simplifications in the circuitry introduced by WO 98/05112 enable simple and low cost electronic machine control, but reduce the flexibility of the machine to be controlled under rapid acceleration or deceleration, as well as reducing the control of speed under load. It is an object of this invention to provide an electrical machine which has simple control circuitry but can also achieve high performance.

According to the present invention, there is provided an electrical machine comprising a rotor without windings, a stator having an armature winding and field magnet means for generating a magnetomotive force in a direction extending transversely of the magnetomotive force generated by the armature winding, circuit means for controlling the current in the armature winding such that periods in which a magnetomotive force in one direction is associated with a first current pulse alternate with periods in which a magnetomotive force in the opposite direction is associated with a second current pulse, and position sensing means for monitoring the rotational position of the rotor and for supplying output signals dependent on the speed of rotation of the rotor, characterised by control means for supplying control signals to the circuit means to control the current in the armature winding, each control signal being produced in response to detection of a respective one of said output signals from the position sensing means and being maintained for a length of time determined by the duration of said output signal. The armature winding may be shunt or series connected, and the field magnet means may be constituted by a field winding or a permanent magnet.

The preferred embodiment of the invention allows control of acceleration, no-load speed and loaded torque-speed characteristics to be achieved with simple on/off control of armature and field switching devices, so that the appropriate control circuitry can be produced at relatively low cost. Simplification of the control circuitry is further ensured by the fact that such control can be effected without current sensing. Furthermore the high frequency pulse width modulation of the current pulses is required only during acceleration, thus reducing dissipation losses in the drive. The current pulse width during high speed and loading can easily be changed to control the no-load speed and the shape of the torque speed curve to produce a desired characteristic to match the requirement of the load.

In order that the invention may be more fully understood, reference will now be made, by way of example, to the accompanying drawings, in which:

FIGS. 5a, 5b and 5c are circuit diagrams showing circuit arrangements for energising the field and armature windings of embodiments of the invention;

Figure 1A:
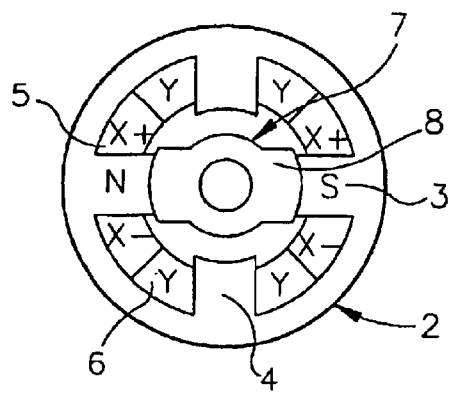
FIG. 1a and 1b are explanatory diagrams showing a conventional two-phase variable reluctance motor, with the two excitation modes being shown in FIG. 1a and 1b.
Figure 1B:
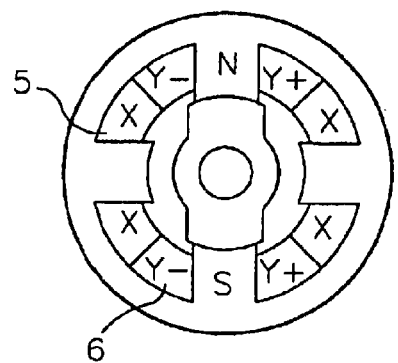
Figure 2A:
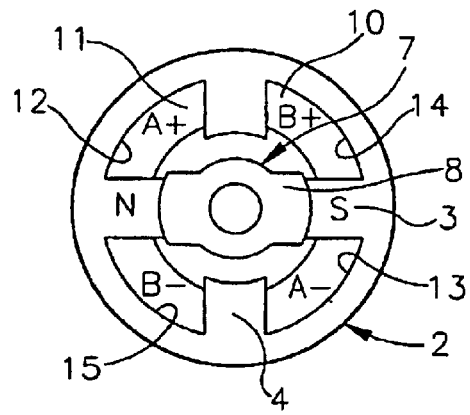
FIGS. 2a and 2b are explanatory diagrams showing a flux-switching motor, with the two excitation modes being shown in FIGS. 2a and 2b.
Figure 2B:
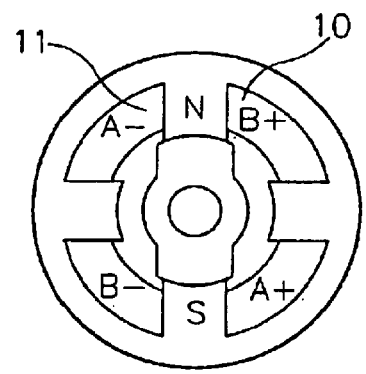
Figure 3A:
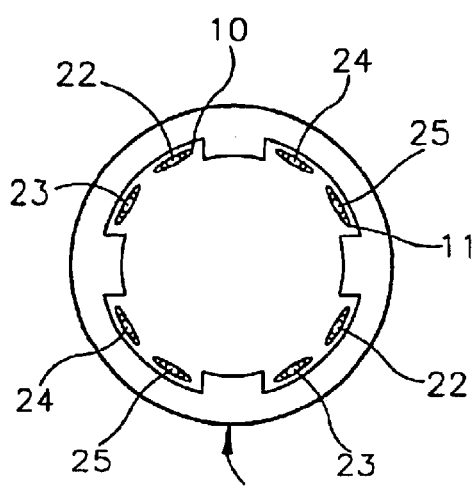
FIGS. 3a and 3b are explanatory diagrams showing the stator windings for a flux-switching motor as disclosed in WO 98/05112.
Figure 3B:
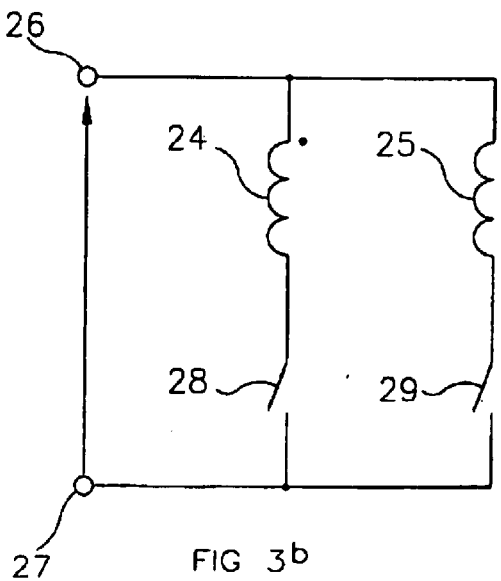
Figure 4:
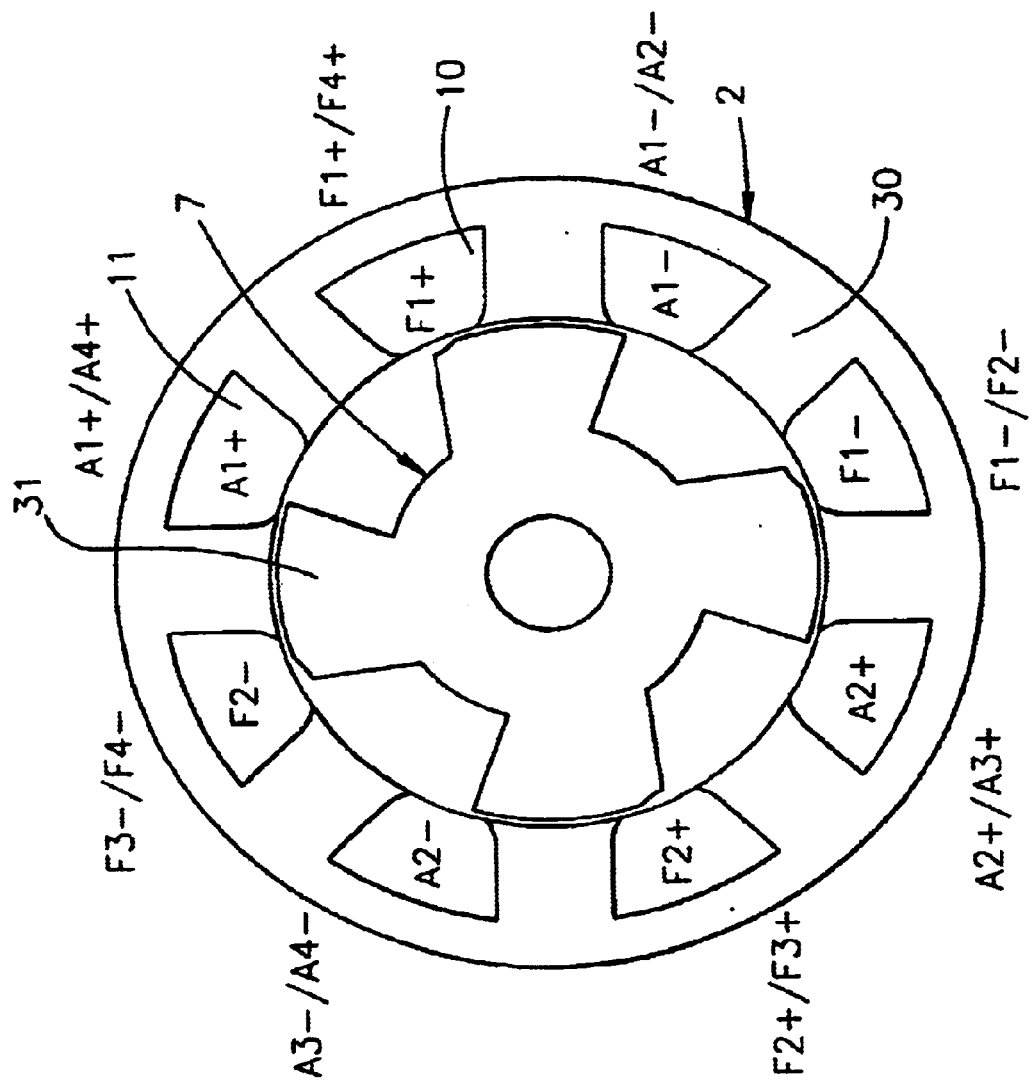
FIG. 4 is a diagram of a flux-switching motor having an 8-pole stator and a 4-pole rotor.

The following description of embodiments of the invention is given with reference to a flux-switching motor having a stator 2 provided with eight inwardly directed salient poles 30 and a rotor 7 having four outwardly directed salient poles 31 without windings, as shown in FIG. 4. The stator 2 is provided with a field winding 10 and an armature winding 11 connected in a shunt or parallel configuration (as shown in FIG. 5a) or in a series configuration (as shown in FIG. 5c). The armature winding 11 may comprise two armature winding parts A1 and A2 connected in series or in parallel, and the field winding 10 may comprise two field winding parts F1 and F2 connected in series or in parallel, the winding parts being wound on the stator 2 as shown within the stator in FIG. 4. Each armature winding part is split into two coils 24 and 25 which are closely magnetically coupled and wound so that diametrically opposite portions of the coils are disposed within stator slots separated by a field winding slot. The armature coils 24 and 25 are wound in opposite directions and may be bifilar wound where appropriate. However the winding configuration is preferably substantially as described with reference to FIG. 6 of WO 98/05112 such that each of the armature and field windings comprises four coils A1, A2, A3, A4 and F1, F2, F3, F4 connected together in series or in parallel (or any combination of series and parallel) and wound around the stator poles such that the active portions of adjacent coils are accommodated within the same stator slot. The winding configuration in this case is shown in FIG. 4 by the symbols indicated outside the stator in the figure. In FIG. 4 the symbols + and – show the directions of current flow in the windings in one mode of excitation, and it will be understood that, in the alternate mode of excitation, the direction of current flow in the armature windings is reversed whereas the direction of current flow in the field windings is unchanged.

In the energisation circuitry 40 of the embodiment of FIG. 5a, the field winding 10 is connected in parallel with the armature coils 24 and 25 and a capacitor 57 which allows the currents through the field winding 10 and the armature coils 24 and 25 to be different. The circuit is supplied from an alternating current source by way of a rectifier bridge 59. A power MOSFET 54 and a freewheeling diode 56 are provided to control the field current supplied to the field winding 10.

Figure 11:
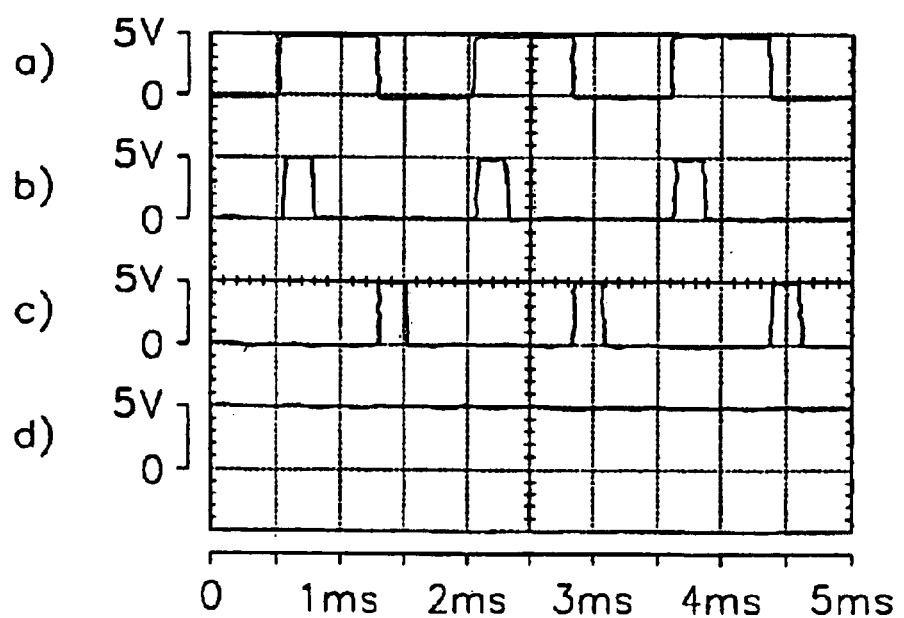
Figure 12:
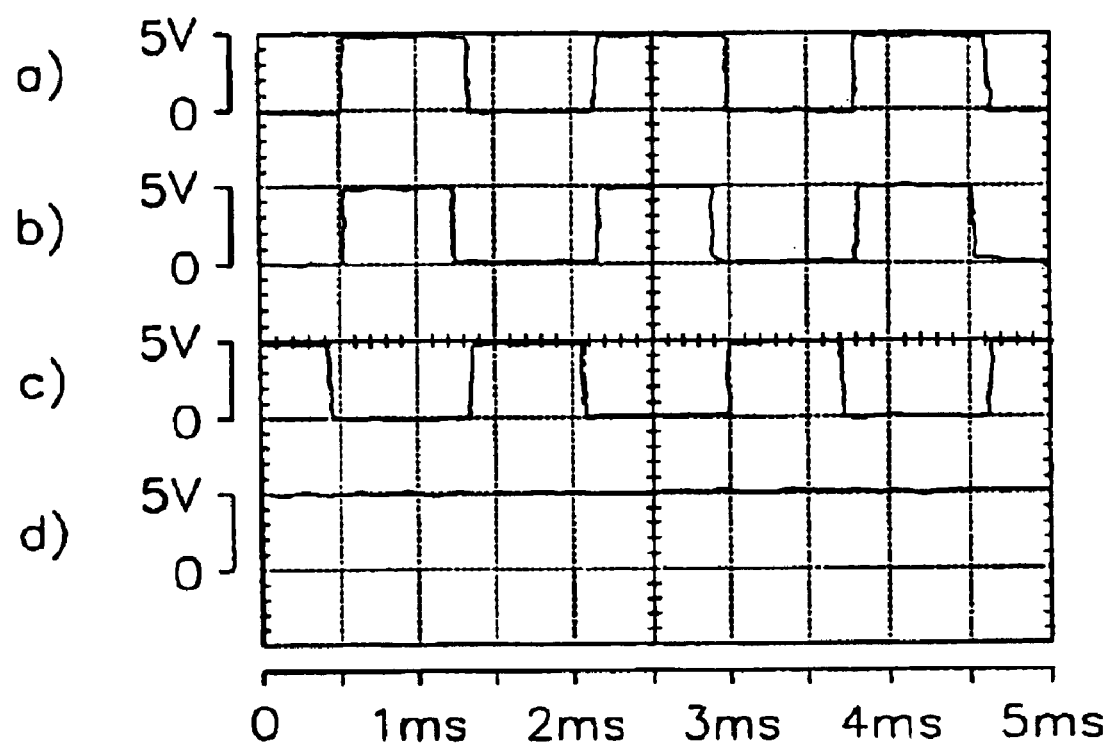
Figure 14:
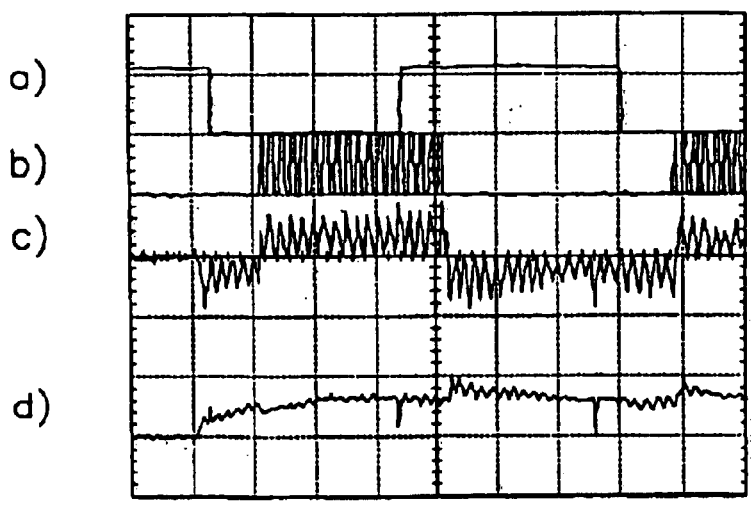
FIG. 14 is a timing diagram showing the switch control signals applied to a further embodiment of the invention during low speed operation.

In the energisation circuitry 40' of the series embodiment of FIG. 5c, the field winding 10 is connected in series with the armature coils 24, 25, and a capacitor 57 is connected to the interconnection point 57 A between the field winding 10 and the armature coils 24, 25 so as to allow the field current to continue to flow as the energy from the armature winding is returned back to the capacitor 57 through one of the diodes 52 or 53. A further capacitor 58 is connected across the output of the rectifier bridge 59, and an optional inductor 60 is connected in series with the output of the rectifier bridge 59, so as to filter the supply to the circuit As shown in broken lines, it is also possible to provide a diode 61 in series with the field winding 10 to prevent the current in the field winding 10 reversing when the capacitor 57 is charged to a voltage above the supply voltage on the capacitor 58. In an alternative, non-illustrated arrangement, such as is shown in FIGS. 11 and 12 of WO 98/05112 for example, the field winding 10 may be connected in series with the armature coils 24 and 25. In a still further, non-illustrated arrangement, as is shown in FIG. 14 of WO 98/05112, for example, the field winding 10 may be supplied with current from a separate current source.

In each of these embodiments a switching control circuit is provided to supply current alternately to the armature coils 24 and 25 so as to provide the required magnetomotive forces acting in opposite directions to rotate the rotor. In this case the switching control circuit incorporates two power MOSFETs 50 and 51 which are switched on and off alternately by appropriate switching pulses. Each MOSFET 50 or 51 includes an integral freewheeling diode 52 or 53 so that, as each MOSFET is turned off, the stored magnetic energy in the corresponding coil is coupled to the other coil and flows back through the freewheeling diode of the other MOSFET. Furthermore the ends of the armature coils 24 and 25 may be connected by diodes 63 and 64 to a snubber capacitor 65 which charges to a voltage above the supply rail voltage. The snubber capacitor 65 is discharged by the parallel resistor 66 so as to dump the energy stored in the snubber capacitor 65 from the imperfect switching process. The snubber capacitor 65 is provided to capture energy not transferred to the other armature coil when one of the armature coils is switched off by its respective switching device.

The additional snubber circuit formed by the components 63, 64, 65 and 66 is particularly important when insulated gate bipolar transistors (IGBTs) are used as the switching devices. IGBTs are easily damaged by device overvoltage, and the snubber circuit is used to contain the voltages occurring in the circuit to a level less than the voltage rating of the IGBTs. When MOSFET's are used as in FIG. 5a, the snubber circuit can be dispensed with if the MOSFET's are chosen to provide an inherent voltage clamp as they enter a breakdown (avalanche) mode above their rated voltage. This breakdown mode absorbs the uncoupled magnetic energy associated with the imperfect coupling of the armature windings with one another. Provided that adequate heat dissipation is available the MOSFET's will not suffer any damage through this process, and the complexity and cost of the snubber circuit is not therefore required.

On initial start-up of the motor, it is necessary to control the field and armature currents so as to provide the desired acceleration. As previously indicated the basis of all control operations for rotation of the rotor is that unidirectional current is supplied to the field winding substantially continuously, and alternate current pulses are supplied to the two armature coils such that the current pulses are synchronised to the position of the rotor. In the motor shown in FIG. 4, with eight stator poles and four rotor poles, a cycle of armature excitation involving positive armature mmf followed by negative mmf would be repeated with every 90° of rotor rotation. As a result it is usual to use a rotor position sensor to control the switching transition points within each armature cycle. In its simplest form the rotor position sensor could be an optical sensor which changes polarity with every 45° of rotation of the rotor, triggered by the interruption or reflection of an infra-red beam by the rotor or a disc mounted on the rotor. Another common means of position detection would be the use of a Hall effect sensor to detect north and south poles on a magnet ring attached to the rotor.

Figure 5B:
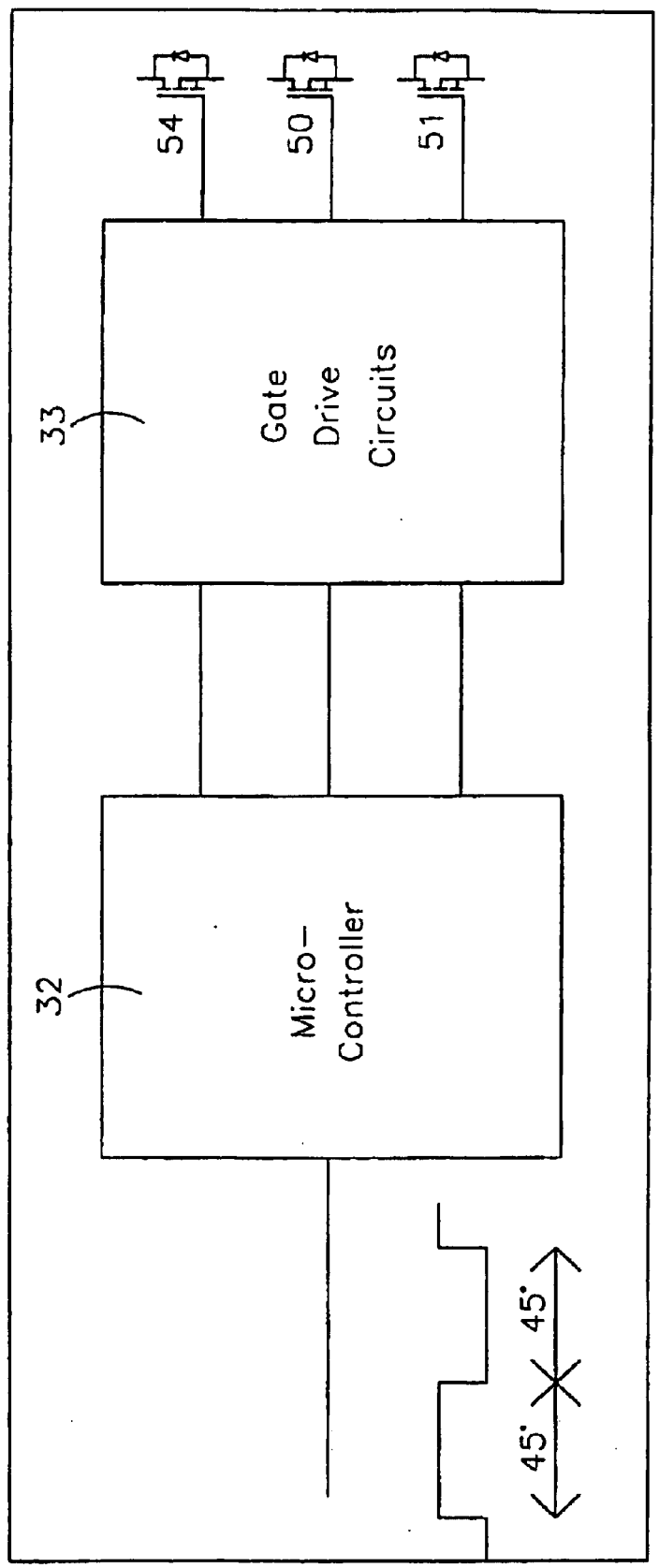

During low-speed operation, the application of the full supply voltage by turning on one of the armature switches for the whole 45° of rotation could cause excessive armature current. The current can be controlled by pulse width modulation of the appropriate armature switch. In a shunt motor, it may also be advantageous to pulse width modulate the switch controlling the field winding current so that the level of the field current is also controlled at the same time as the armature current. The signal from the rotor position sensor would normally be processed by a simple microcontroller 32, as shown in FIG. 5b, which controls the gates of the switches 50, 51 (and 54 if present) by way of gate drive circuits 33. The microcontroller 32 decodes the alternating signal from the position sensor to decide which of the switches 50 and 51 should be conducting at any point in time or perhaps that neither should be conducting. (In normal operation of the motor it is not necessary to have both switches 50 or 51 conducting at the same time.) The microcontroller 32 also determines the operation of the switch 54 (if present controlling the field current.

Figure 6:
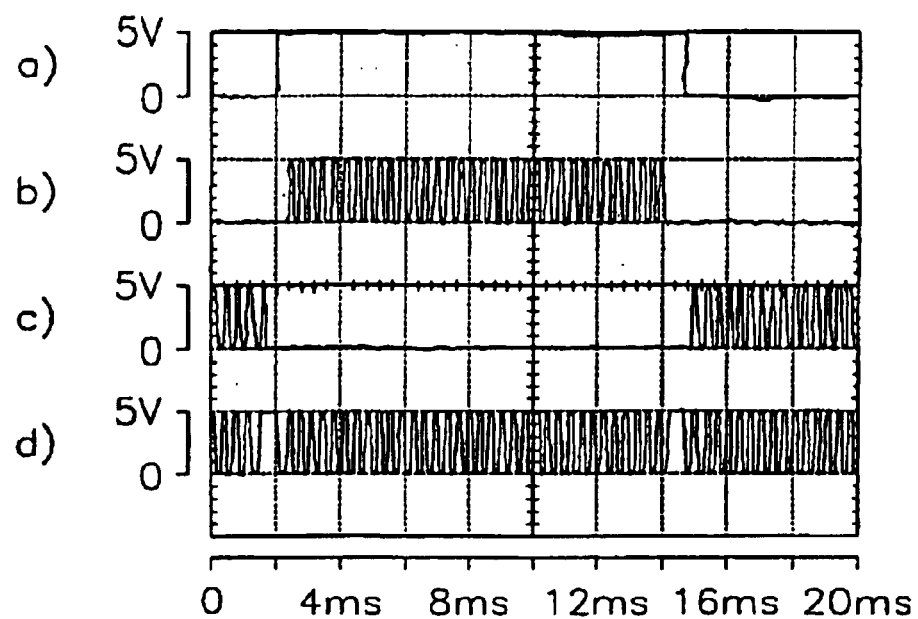
FIGS. 6, 7, 8 and 9 are timing diagrams showing the switch control signals applied during low speed operation.

Thus, as shown by the timing diagram of FIG. 6, the change in state of the position sensor from low to high initiates a train of pulses on the Armature 1 output of the microcontroller 32. This train of pulses is converted by the corresponding gate drive circuit 33 into a signal suitable for the control of the appropriate switch 50 or 51 so as to turn the switch repetitively on and off(a switching cycle) at a frequency much higher than the sensor frequency, thus establishing and controlling a positive or negative armature mmf during a 45° rotation of the rotor. The duty cycle is the percentage of time a switch is turned on (conducting) within each switching cycle. When the motor first starts the duty cycle may be approximately 50%, though a value between 0 and 100% can be chosen depending on the initial torque required and the rate of acceleration desired. FIG. 6 shows, at a), the 40 Hz rotor position signal corresponding to a speed of 600 r/min for this motor, and, at b), c) and d), the switch control signals at the Armature 1, Armature 2 and Field outputs of the microcontroller 32. The pulse width modulation is applied for virtually the whole duration of the output pulse of the rotor position signal which determines the initial switch-on times of the switches 50 and 51. The switch control signal for the field current is also pulse width modulated at the same time as the pulse width modulated switch control signals for controlling the currents in the armature coils, and is energised continuously when the currents applied to the armature coils are switched off.

Figure 7:
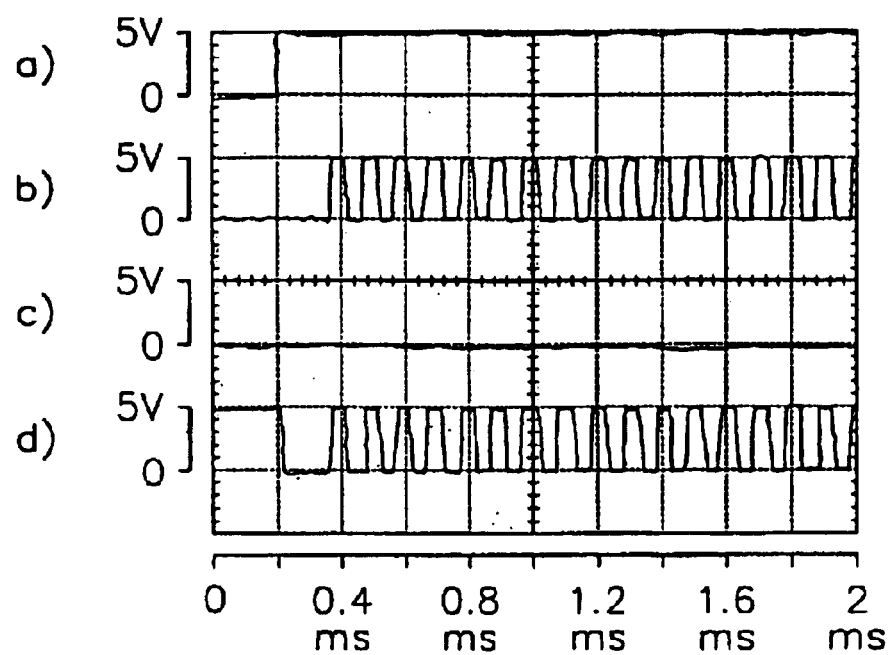

FIG. 7 shows the form of the switch control signals supplied to the armature coils 24 and 25 and to the field winding 10 simultaneously during a part of the cycle, when the motor is operating at a speed of 600 rpm. In this case a switching duty cycle of 52.5% is used to control both the armature and field currents. Such a duty cycle is appropriate for control of the armature and field currents from start-up of the motor. However the duty cycle may be chosen to have any value between 0 and 100% depending on the torque required and the rate of acceleration.

However, as the motor accelerates, the duty cycle of the signals applied to the switches 50, 51 and 54 is steadily increased, and in addition the period of energisation of each armature coil 24 or 25 may be reduced to be less than the total pulse width of the output of the rotor position signal in order to avoid excessive armature currents towards the end of each current energisation period of the armature coils.

Figure 8:
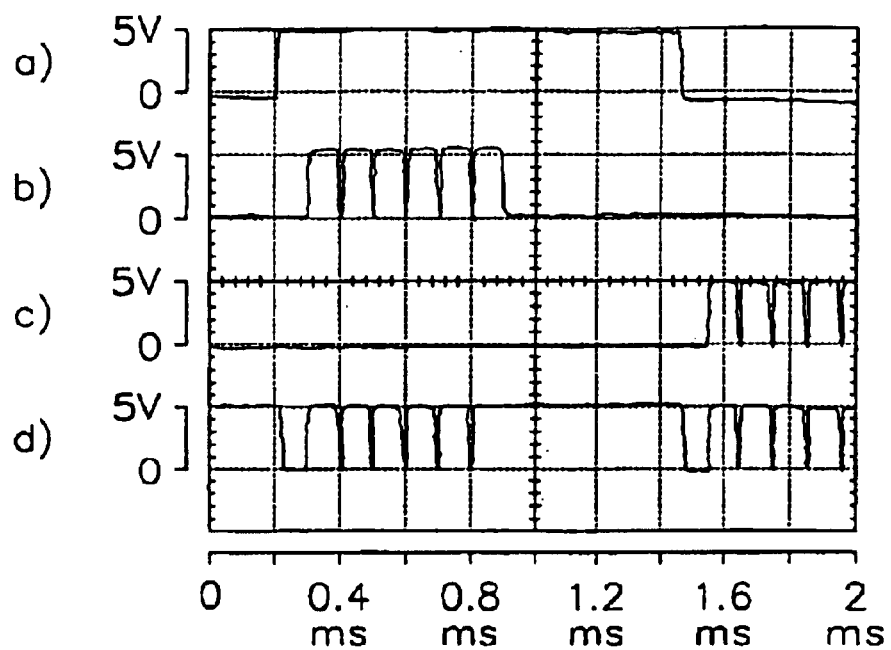
Figure 9:
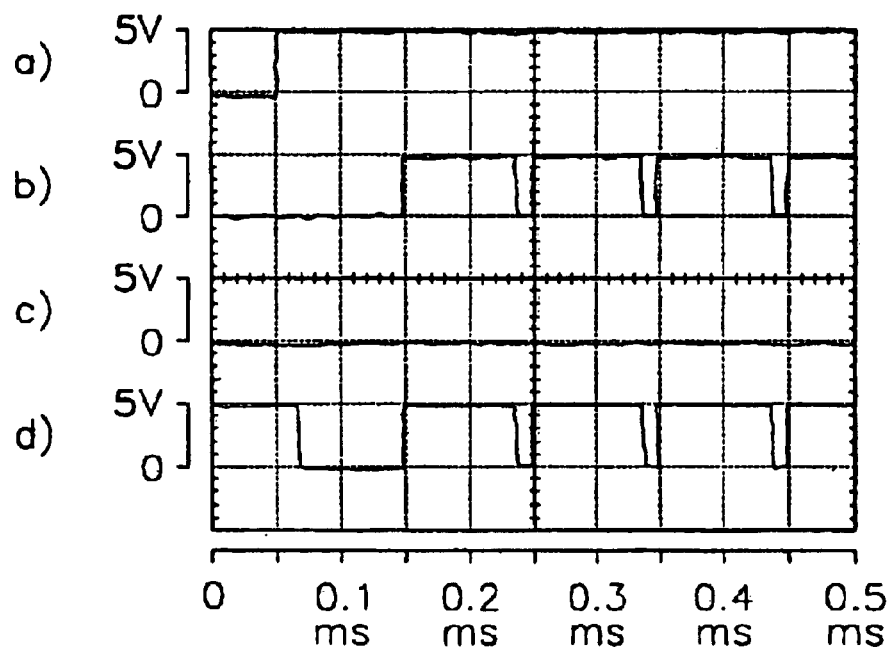

When the motor has accelerated sufficiently such that the switching duty cycle has increased to close to 100%, each armature coil may be excited for approximately 50% of the total pulse width of the output of the rotor position signal, as shown by the timing diagram of FIG. 8 corresponding to a motor speed of 6,000 rpm. Motor torque and acceleration time can thus be controlled by variation of the switch duty cycle and by variation of percentage of the total pulse width of the rotor position signal during which the armature is excited. In the case of the embodiment of FIG. 4 having eight stator poles and four rotor poles, the rotor position signal has an output frequency of 400 Hz at 6000 rpm. It will be noted from this diagram that pulse width modulated switch control signals are supplied to the first armature coil 24 and the field winding 10 for about 50% of the duration of the rotor position signal output pulse, and that the control signal is supplied substantially continuously to the field winding 10 throughout the remaining 50% or so of the pulse duration. This ensures that the field winding excitation is maintained at a high level which provides maximum torque from the applied armature current. In a series motor the field winding current will always be a function of the current and power supplied to the armature and cannot be controlled independently. FIG. 9 shows the switch control signals on an increased scale and indicates that the switching duty cycle applied for switching of the armature and field windings is approximately 88%, that is not quite 100%.

In some applications where the load is such that rapid acceleration of the motor can be guaranteed (such as a pump, fan or blower in which the load torque is low at low speeds), it is possible that pulse width modulation of the armature switches within each polarity of armature excitation will not be necessary. In such a case the currents flowing may simply be limited by the available supply conditions. The motor will then accelerate rapidly and the current will decrease to a lower level as the speed increases. The rate of acceleration can still be controlled by the duration and position of the armature excitation current within each state of the position sensor.

Figure 10:
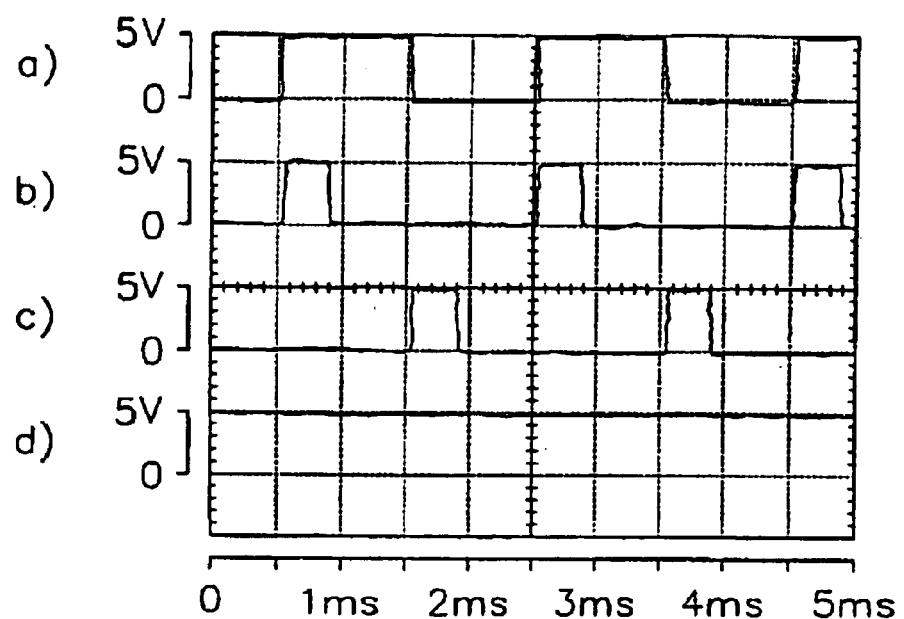
FIGS. 10, 11 and 12 are timing diagrams showing the switch control signals applied during high speed operation.

After the motor has accelerated to the point where the switching duty cycle has reached 100%, further acceleration will result in control of the armature and field currents according to a high speed mode in which pulse width modulation of the switch control signals is no longer applied. Instead the on-time of each switch control system is reduced as the speed is increased whilst retaining the same turn-on point determined by the change in state of the rotor position signal output pulse. This is shown by the timing diagrams of FIGS. 10 and 11. In FIG. 10 the armature and field switch (if present) control signals are shown for a motor speed of 7,500 rpm, which, in this example, is just above the speed at which change-over to the high speed mode is initiated. In this case the rotor position signal output frequency is 500 Hz, and the switch control signals are of narrow width relative to the total width of the rotor position signal output pulses in order to control acceleration by limiting of the armature currents. In a shunt motor where control of the field is possible independently of the armature, the field switch could be turned on throughout this time, although, if light-load efficiency is of importance, it is also possible for the field switch control signal to be modulated to reduce field losses.

The timing diagram of FIG. 11 shows the armature and field switch control signals when this particular motor is operating at a speed of 9,750 rpm in which case the rotor position signal output frequency is 650 Hz It will be appreciated that, in this case, the armature switch control signals are narrower so as to limit the no-load speed of the motor. The circuit can be set up to provide any desired armature current pulse width for a given motor speed to provide the required control of no-load speed corresponding to the timing diagram of FIG. 11. Furthermore, as the switching points of the position sensor relative to the magnetic cycle of the armature are not necessarily the same with each implementation, the position of this narrow pulse can be placed anywhere within the position sensor cycle to obtain the best energy conversion. If a load is applied it will tend to slow down the motor and the corresponding drop in speed may be detected as an increased length of time between position sensor transitions in the rotor position signal. As a result the on-time of the switches 50 and 51 is increased as a function of the increasing time between rotor position signal transitions. This function is determined either by a numerical calculation or by reference to a look-up table relating the on-time to the rotor position signal transitions. Variation in this function can be used to cause the torque speed curve of the motor to take on a number of different shapes. However, in all cases, the switching control is based only on the rotor position and the calculated speed and there is no requirement for sensing of the current to control such switching.

The motor reaches a full load point for a particular speed when the width of the current pulses applied to the armature coils 24 and 25 is such that the armature circuit is excited for 100% of the available time. In practice, because of the inductance of the armature coils and the finite time required to reduce each armature current pulse to zero, the maximum time of forward conduction of each switch 50 or 51 is typically between 70% and 90% of the available time. Furthermore some motors may not operate well if the armature winding becomes continuously excited. In such a case, if the current is not actively monitored, one armature current polarity may become larger than the other armature current polarity and the motor will stall.

For this reason the on-time of the switches 50 and 51 is controlled in accordance with the control method of the invention so as to ensure that the on-time is no more than a maximum predetermined percentage of the available time, this typically being no more than about 90% of the rotor position signal output pulse width. This prevents instability of the armature excitation without requiring measurement of the armature current, although some motors will not develop the imbalance described above and the armature switches can each operate for 100% of the position sensor pulse width (i.e. for 50% of the armature's electrical cycle), although the current will be flowing in the diode of the device during the initial part of each device conduction period. Furthermore this method allows the motor to operate close to its natural torque speed characteristic over a wide speed range. FIG. 12 is a timing diagram showing the armature and field switch control signals at a motor speed of 9,150 rpm when this method of controlling the on-time of the switches is applied on application of a load. The corresponding rotor position signal output frequency is 610 Hz.

The control algorithms can be designed to give a range of different characteristics including delivery of a constant power characteristic over a wide speed range. Simple adjustment of the function relating the on-time of each switch 50 or 51 to the time between rotor position signal transitions allows any characteristic to be achieved within the natural torque speed characteristic of the motor. FIG. 14 shows possible torque speed characteristics which may be imparted to the motor in this manner, the curve 70 shown in broken lines in this figure indicating the natural torque speed characteristic of the motor with 100% armature current excitation and a given set of field winding conditions. Further examples 71, 72 and 73 of possible torque-speed curves are shown for which torque can be controlled as a function of speed within the maximum curve. In the region 74 such control can limit the no-load speed to any chosen value. Furthermore one of the curves 71, 72 and 73 may be chosen to follow a line of constant output power over a wide speed range.

In a variant of the embodiment of the invention described above, the rotor position signal is dispensed with and instead an arrangement is used for electronically calculating the position of the rotor from the sensed armature (and/or field) voltage (and/or current). This can be achieved by providing an extra winding in the armature (or field) slots of the stator coaxial with at least one of the armature coils and by detecting the back-emf induced in the winding. In fact the voltage induced in this winding is a combination of the armature back-emf and the armature supply voltage provided by the armature switches. Accordingly a suitable decoding arrangement is provided to reconstruct the back-emf waveform so as to produce a timing signal which can be used for timing of the armature excitation. Alternatively the armature winding itself can be used for such back-emf sensing since one of the armature coils is always unenergised at any one time. Such a position sensing arrangement enables the position of the rotor to be determined and the excitation of the armature winding and its dependence on rotor position to be controlled in a particularly simple manner.

It will be appreciated that, although power MOSFETs are used in the energisation circuitry of FIG. 5a and FIG. 5c, it would also be possible for other types of switches to be used in the circuitry, such as thyristors and IGBT's (insulated-gate bipolar transistors).

In a further embodiment of the invention for controlling a shunt motor, the microcontroller is programed to effect continuous energisation of the field switch during all or part of the acceleration while the modulation of the armature switches is retained. This may provide for a more rapid acceleration of the motor and is a further simplification in control complexity. In the high speed mode, it is beneficial to reduce the level of current supplied to the field windings when the motor speed is close to the no-load speed. This can be implemented by switching the field switch 54 off during the time when neither armature switch 50 or 51 is turned on.

The position of the armature current pulses, and hence the rotor position sensor, relative to the actual rotor laminations is critical to obtaining the best performance from the motor. For optimum performance, the armature mmf of positive polarity should be present when the induced armature voltage (due to rate of change of field flux coupling the armature winding) becomes positive i.e. the internally induced armature voltage (the back emf) is in opposition to the applied armature current. As the armature winding is inductive the current takes time to change causing a delay in the build up of current relative to the initialisation of the control signal to the appropriate armature switch. At low speeds this time is not a significant angle of rotation but, at high speeds, this delay may lead to a significant loss in output power. There are two ways in which this problem can be solved.

The rotor position sensor can be positioned so that the transitions occur close to the zero crossing of the back emf. When running at high speed the microcontroller can use the measured speed to anticipate the sensor transitions and initiate an armature pulse in advance of the sensor transition. Such electronic advancing schemes as such are known. However, at very high speeds when the time between sensor transitions may be short, the accuracy obtained from such schemes can drop unless an expensive microcontroller is employed. Such a scheme is also inaccurate at predicting the advanced turn on point if there are rapid variations in the running speed.

Alternatively the rotor position sensor may be mechanically positioned, in advance of the zero-crossing of the armature induced voltage, such that at high speed the transitions of the sensor are correctly positioned to ensure that the current has time to build up in each armature winding without requiring any complex control and thus allowing a simple and low cost microcontroller to be used. However such a scheme has the disadvantage that, at low speeds, the sensor transition may initiate a reversal of the armature mmf before it is really required. With such mechanical advancing of the position sensor, it is therefore necessary at low speeds to delay reacting to the sensor transition until the rotor has turned through a further angle equivalent to the angle of mechanical advance. In one implementation of this arrangement, a mechanical advance of the position sensor of 11° was found to be beneficial at high speed (relative to 45° sections of high and 45° sections of low). As this is approximately one quarter of the time between transitions it is relatively easy within a low cost digital microcontroller to insert a delay of one quarter of the total measured time. The control signals obtained in such an arrangement are shown in FIG. 14 where the position sensor signal is shown at a), the switch control signals for one armature switch are shown at b), the armature mmf is shown at c) and the field current is shown at d).

Under light load conditions at all speeds it is not necessary to develop the full motor power and, as a result, the armature pulses may be significantly shorter than the available time between the rotor position signal transitions. In such circumstances it is preferable to delay the application of the armature pulses even further to a time when the armature induced voltage is at a maximum. Such a control method delivers the maximum efficiency from the motor under light loads.

Of the above two solutions the method of mechanically advancing the position sensor enables a simpler microcontroller to be used and is preferred for this reason.

Finally a description will be given of the high speed and load modes in a preferred embodiment of the invention which have been developed for a particular motor to give constant power operation when the motor is loaded from 15,000 r/min down to 7,500 r/min. It should be noted that these algorithms are all based on simple multiplications and divides which can be implemented by addition and bit-shifting in a simple low cost microcontroller. A similar approach could be achieved with a look-up table stored in memory but this would require the storage of more data.

The loading of the motor causes the speed to drop from the no-load speed which is just above 18,000 r/min. As the speed drops a number of successive algorithms are implemented to control the pulse width applied to each armature coil within the available time of each sensor region. For illustrative purposes, the turn-on point in all of these algorithms is at the change of state of the sensor, that is 11° ahead of the change in polarity of the back emf, although motor efficiency may be improved by delaying the turn-on point under some operating conditions.

The load routines are as follows:

No load speed to 15,000 rev/min. The pulse width is calculated using $$((3*\text{sensor})-267) \times 4 \, \mu s.$$

where "sensor" denotes a count value from the microcontroller 32 representing the time between transitions of the sensor.

This algorithm increases the pulse width from the minimum value at the no-load speed and reaches a maximum pulse width of 416 μs at 15,000 r/min. This corresponds to an armature excitation during 83.5% of the available time.

15,000 r/min to 14,300 r/min. The pulse width is rapidly shortened to give a sharp knee in the torque speed characteristic reducing from the maximum value at 15,000 r/min to 73% at 14,300 r/min. The algorithm during this time is (224−sensor)×4 μs.

The negative sign in the term incorporating "sensor" ensures that the pulse width decreases in absolute time despite an increase in the value of "sensor".

14,300 r/min to 12,300 r/min. The algorithm during this time is $$\left(\frac{3}{16} \times \text{sensor}\right) + 71 \times 4 \ \mu s.$$

This algorithm reduces the percentage on-time of the armature to a value of 66% at 12,300 r/min.

12,300 r/min to 7,500 r/min. The algorithm is now changed to (sensor/4+62) *4 μs.

Figure 13:
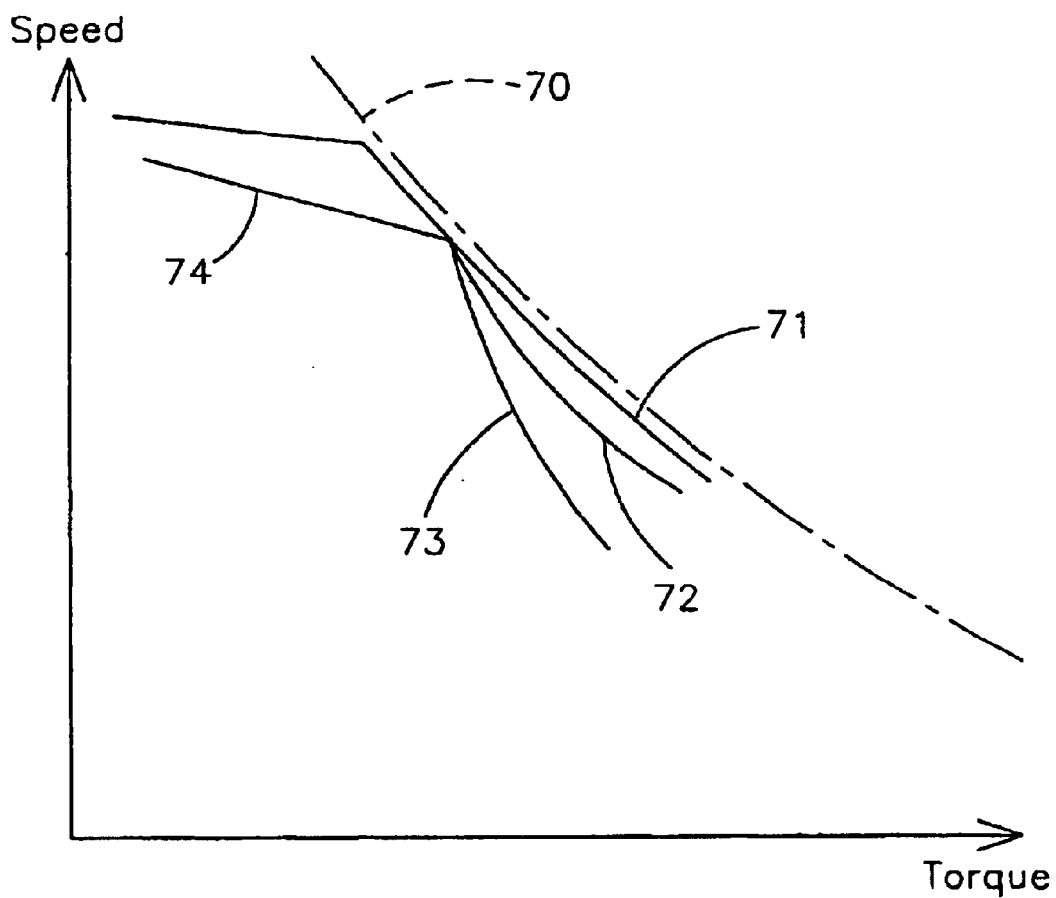
FIG. 13 is a graph showing possible torque-speed characteristics of the motor.

This allows a slower drop in percentage on-time as the speed decreases further to maintain the operation close to constant power (17 in FIG. 13).

What is claimed is:

1. An electrical machine comprising a rotor without windings, a stator having an armature winding and field magnet means for generating a magnetomotive force in a direction extending transversely of the magnetomotive force generated by the armature winding, circuit means for controlling the current in the armature winding such that periods in which a magnetomotive force in one direction is associated with a first current pulse alternate with periods in which a magnetomotive force in the opposite direction is associated with a second current pulse, and position sensing means for monitoring the rotational position of the rotor and for supplying output signals dependent on the speed of rotation of the rotor, characterised by control means for supplying switching control signals to the circuit means to control the current in the armature winding, such that each switching control signal is produced in response to detection of a respective one of said output signals from the position sensing means and so that the switching on time is maintained for a length of time determined by the duration of said output signal.

2. A machine according to claim 1, wherein the armature winding comprises armature coils connected to the circuit means such that the currents in the coils vary in synchronism with rotation of the rotor under control of the control means in such a manner that periods in which a magnetomotive force in one direction is associated with current flow in one of the coils alternate with periods in which a magnetomotive force in the opposite direction is associated with current flow in the other coil.

3. A machine according to claim 2, wherein the coils are closely coupled magnetically.

4. A machine according to claim 2, wherein the circuit means comprises respective switch means for alternately conducting first current pulses in one of the armature coils and second current pulses in the other armature coil under the control of the control means.

5. A machine according to claim 1, wherein the field magnet means comprises a field winding wound on the stator and supplied with substantially unidirectional current by the circuit means.

6. A machine according to claim 5, wherein the field winding is connected in a parallel configuration with the armature winding.

7. A machine according to claim 5, wherein the field winding is connected in a series configuration with the armature winding.

8. A machine according to claim 1, wherein, in a low speed mode, the control means is arranged to produce pulse width modulated switching control signals having a duty cycle which increases with increasing speed of the rotor to control the current in the armature winding when the rotor is rotating at a relatively low speed.

9. A machine according to claim 8, wherein, in the low speed mode, the control means is also arranged to produce pulse width modulated switching control signals to control the current in the field magnet means.

10. A machine according to claim 1, wherein, in a high speed mode, the control means is arranged to produce switching control signals which are not pulse width modulated to control the current in the armature winding when the rotor is rotating at a relatively high speed.

11. A machine according to claim 10, wherein, in the high speed mode, the control means is arranged to produce switching control signals of decreasing width as the speed of rotation of the rotor increases.

12. A machine according to claim 10, wherein, in the high speed mode, the control means is arranged to produce switching control signals having a switching on-time which is controlled to be less than a maximum predetermined value when a load is applied to the machine.

13. A machine according to claim 1, wherein the control means is arranged to produce switching control signals having a switching on-time which is controlled so as to follow a predetermined torque-speed characteristic.

14. A machine according to claim 1, wherein the position sensing means incorporates a sensor for providing an electrical output in response to detection of markings on the rotor.

15. A machine according to claim 1, wherein the position sensing means incorporates a sensor for detecting variation of a parameter of the armature winding or the field magnet means or a separate sensor winding provided on the stator.

16. A machine according to claim 15, wherein the armature winding incorporates the sensor winding.

17. A machine according to claim 1, wherein the position sensing means incorporates decoding means providing a timing signal related to the position of the rotor.

* * * * *